(12) United States Patent
Li

(10) Patent No.: US 10,407,576 B2
(45) Date of Patent: Sep. 10, 2019

(54) WATER REPELLENT SPRAY APPLIED FIRE RESISTIVE MATERIALS

(71) Applicant: United States Mineral Products Company, Stanhope, NJ (US)

(72) Inventor: Qinghua Li, Elk Grove Village, IL (US)

(73) Assignee: United States Mineral Products Company, Stanhope, NJ (US)

( * ) Notice: Subject to any disclaimer, the term of this patent is extended or adjusted under 35 U.S.C. 154(b) by 232 days.

(21) Appl. No.: 14/801,401

(22) Filed: Jul. 16, 2015

(65) Prior Publication Data

US 2017/0015844 A1   Jan. 19, 2017

(51) Int. Cl.
| | |
|---|---|
| C04B 28/00 | (2006.01) |
| C09D 5/18 | (2006.01) |
| C09D 131/04 | (2006.01) |
| C09D 1/08 | (2006.01) |
| C09K 21/02 | (2006.01) |
| C04B 28/04 | (2006.01) |

(52) U.S. Cl.
CPC ............... *C09D 5/18* (2013.01); *C09D 1/08* (2013.01); *C09D 131/04* (2013.01); *C09K 21/02* (2013.01); *C04B 28/00* (2013.01); *C04B 28/04* (2013.01)

(58) Field of Classification Search
CPC ........ C04B 28/04; C04B 28/00; C04B 16/04; C04B 2111/00146; C04B 2111/00232
See application file for complete search history.

(56) References Cited

U.S. PATENT DOCUMENTS

| | | | | |
|---|---|---|---|---|
| 4,048,000 A | * | 9/1977 | McMaster | C04B 28/02 156/304.1 |
| 4,430,463 A | * | 2/1984 | Mullenax | C04B 28/04 524/5 |
| 4,904,503 A | * | 2/1990 | Hilton | C04B 28/02 106/15.05 |
| 5,250,578 A | * | 10/1993 | Cornwell | C04B 28/02 106/122 |
| 5,702,509 A | * | 12/1997 | Pellerite | C04B 41/009 106/2 |
| 5,858,083 A | * | 1/1999 | Stav | A62D 1/0007 106/672 |

(Continued)

FOREIGN PATENT DOCUMENTS

| | | | | |
|---|---|---|---|---|
| CN | 103030336 A | * | 4/2013 | ............ C04B 14/18 |
| CN | 103449788 A | * | 12/2013 | ............ C04B 28/06 |

(Continued)

OTHER PUBLICATIONS

KR 1095381 B1 Kim, Cheon-Suh. Dec. 16, 2011. Derwent abstract.*

(Continued)

*Primary Examiner* — Rip A Lee
(74) *Attorney, Agent, or Firm* — McCarter & English, LLP

(57) ABSTRACT

The present disclosure relates to water repellent coating compositions, kits and methods of applying the same, for use as fireproofing materials. The water repellent spray applied fire resistant material contains an latex polymer(s), such as a vinyl acetate/ethylene copolymer, a silicone, such as methoxy-functional polysiloxane, or both to reduce or eliminate the effect of water damage to the SFRM and underlying substrate.

11 Claims, 3 Drawing Sheets

(56) References Cited

U.S. PATENT DOCUMENTS

| | | | | |
|---|---|---|---|---|
| 8,070,876 B1* | 12/2011 | Jiang | .................... | C04B 20/1033 |
| | | | | 106/638 |
| 9,567,474 B2* | 2/2017 | Noble | .................... | C03C 17/324 |
| 9,650,535 B2* | 5/2017 | Greenwood | ............ | C09D 5/028 |
| 2003/0125404 A1* | 7/2003 | Hilton | ..................... | B28C 5/388 |
| | | | | 521/50 |
| 2003/0125405 A1* | 7/2003 | Hilton | ...................... | B28C 5/06 |
| | | | | 521/50 |
| 2004/0176004 A1* | 9/2004 | Fyfe | ......................... | C09D 5/18 |
| | | | | 442/138 |
| 2005/0084334 A1* | 4/2005 | Shi | ......................... | B09B 1/004 |
| | | | | 405/129.9 |
| 2007/0213445 A1* | 9/2007 | Klijn | ..................... | C08K 3/346 |
| | | | | 524/445 |
| 2015/0274594 A1* | 10/2015 | Li | .......................... | C04B 28/28 |
| | | | | 521/83 |
| 2018/0009994 A1* | 1/2018 | Kreh | ....................... | C04B 28/04 |

FOREIGN PATENT DOCUMENTS

| | | | | |
|---|---|---|---|---|
| KR | 10-1095381 B1 * | 12/2011 | ............ | C04B 24/24 |
| KR | 1095381 B1 * | 12/2011 | | |
| SU | 1740347 A1 * | 6/1992 | ............ | C04B 28/04 |

OTHER PUBLICATIONS

KR 1095381 B1 Kim, Cheon-Suh. Dec. 16, 2011. machine translation.*

PCT International Search Report and Written Opinion for PCT/US2016/041919 dated Oct. 4, 2016.

* cited by examiner

Figure 1 – Water Permeability Test Container
Figure 2 – Specimens cut into two pieces
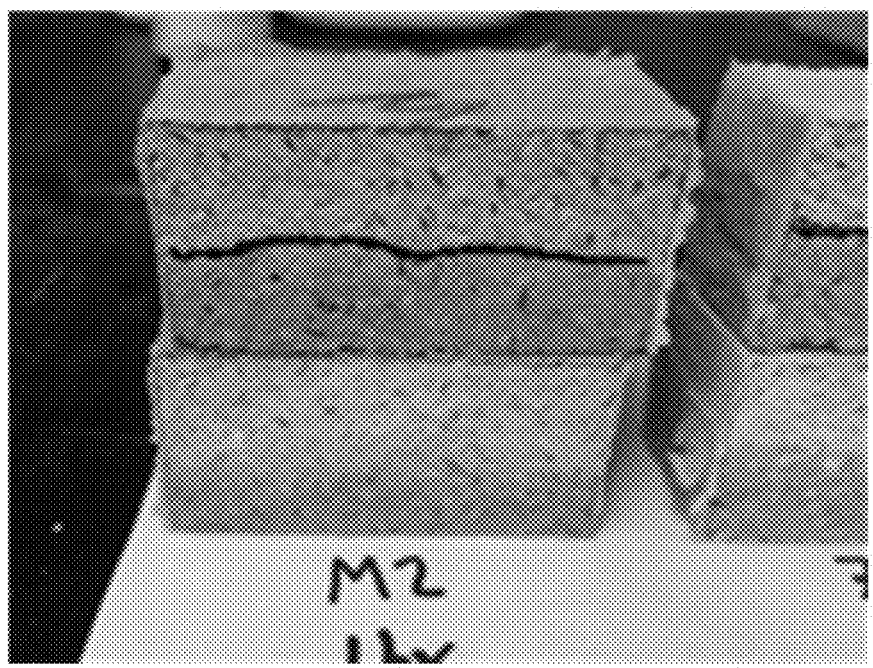

Figure 3 – MII, MII/P
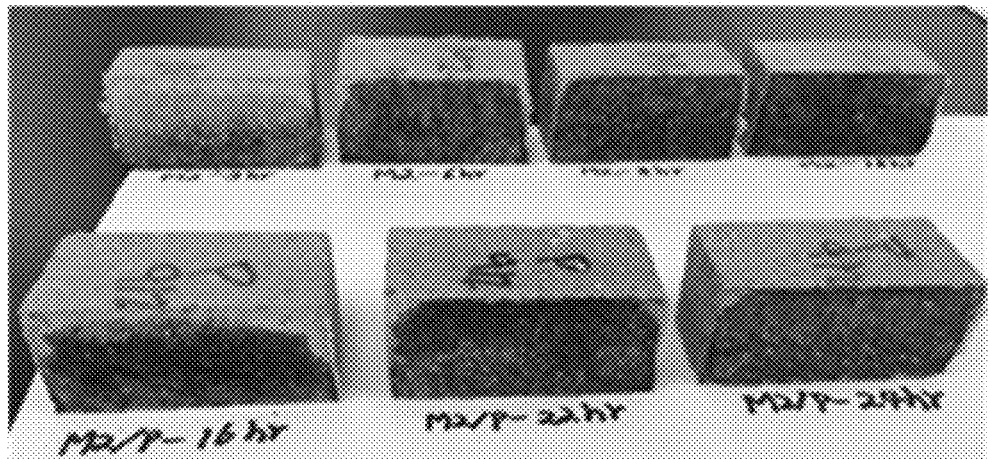
Figure 4 – MII, MII-SDA, MII-SDB

Figure 5 – MII-WAK, MII-WAK-SD
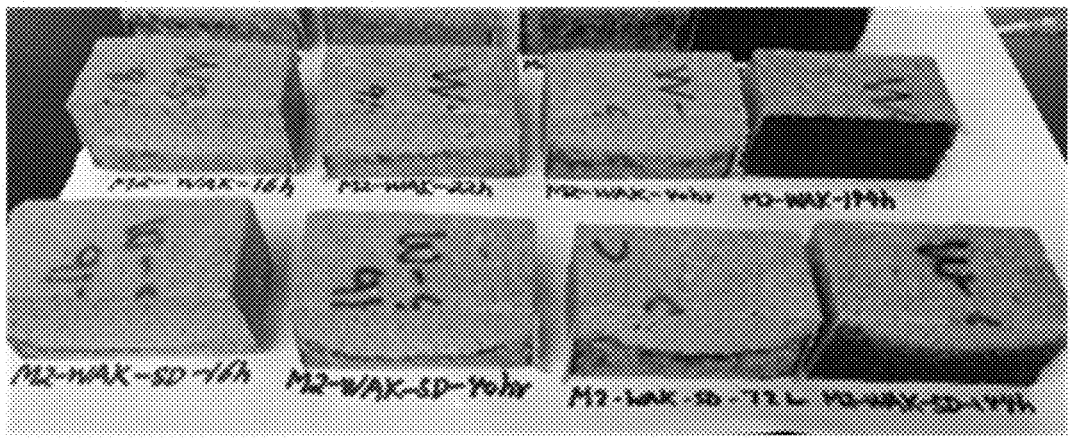
Figure 6 - MII/P-DLP, MII/P-WAK, MII/P-WAK-SD
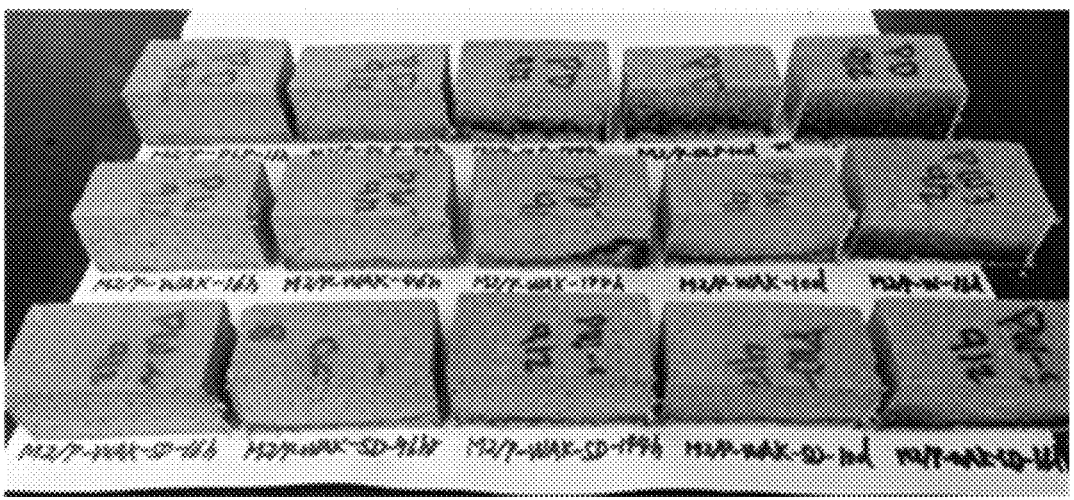

WATER REPELLENT SPRAY APPLIED FIRE RESISTIVE MATERIALS

FIELD OF THE TECHNOLOGY

The present disclosure relates to water repellent coating compositions, kits and methods of applying the same, for use as fireproofing materials.

BACKGROUND

In the construction industry, structures can be coated with passive fireproofing material. Fireproofing material is known to provide fire resistance to substrates susceptible to fire, such as steel elements of buildings including beams, columns, roofs, decks, floors and plates and the like. These materials include spray applied fire resistant materials (SFRMs) which can be used for direct application to structural steel building members. They are predominantly cementitious or plaster-based. Their fire-resistive qualities and physical characteristics can vary widely between the respective types of SFRM. For example, the density of SFRMs are lower than normal weight concrete (e.g., 140-150+ lbs/ft$^3$) and light weight concrete (e.g., 90-115 lbs/ft$^3$, 90-150 lbs/ft$^3$). Because SFRMs are made with light weight coarse aggregates, such as exfoliated vermiculite, mica, low density polystyrene etc., the materials can be very porous. In-place density of the SFRMs can be low (e.g., 15-60 lbs/ft$^3$, 15-70 lbs/ft$^3$).

SFRMs can consist of inorganic binders such as plaster or Portland cement, and various fillers such as vermiculite, mica, limestone, gypsum, lightweight polystyrene beads, mineral wool, glass fibers, ceramic fibers, aluminum ore, clay and quartz. Examples of Portland-cement-based fireproofing products are Fendolite® MII from Isolatek International, Pyrocrete® 241 from Carboline and Monokote® Type Z-146 from W. R. Grace. Examples of plaster-based fireproofing products are CAFCO® 300 from Isolatek International, Pyrolite® 15 from Carboline and Monokote® MK-6 from W. R. Grace. SFRMs differ from concretes in both density and components, e.g., normal concrete can include cement, sand and aggregates/lightweight concrete can include cement, sand and lightweight aggregates.

Due to the low in-place density and porosity of SFRMs, large voids in the interior structure can be present and create pathways for intrusions by water and chemicals, such as salts, fertilizers, etc. Accelerated by water, the intrusions can incur several types of damages, such as freeze-thaw disintegration, alkali-aggregate reaction, sulfate attack, carbonation and corrosion of the underlying substrate (e.g., steel). Consequently, the SFRMs, the underlying substrate or both can be damaged and lose their fire resistant property or structural integrity.

Water repellent additives have been incorporated into concrete serving to aid in the resistance to moisture, such as rain water, from penetrating excessively into the concrete. To date, these types of materials have not been incorporated into SFRMs. For one reason, the application methodology of SFRMs does not lend SFRMs to include water repellent components. Also, there is uncertainty in the industry regarding the compatibility of concrete additive in other materials. Although both SFRM and concrete contain significant amounts of Portland cement, the two classes of product commonly show different properties with respect to additives. Water repellent additives used in concrete are not indicated for SFRMs due to the differences in application, requirements and different effects of common additives. Concrete is normally applied by precasting or casting in place. SFRMs are normally applied by spraying onto structural steel members through a hose under 30-80 psi air pressure. To be effective the SFRM requires good pumpability, good hangability, proper stability and set times, strong adhesion on the substrate, or combinations thereof. In some embodiments, the SFRM exhibits all of these properties.

Moreover, the effects of different additives in both concrete and SFRMs are not similar. For example, the addition of a superplasticizer in concrete allows for the use of less water and increases the concrete's physical strength. The use of a superplasticizer in a SFRM often results in a decrease in the SFRM's physical strength. Similarly, the use of a shrinkage reducing agent can reduce shrinkage in concrete but not in a SFRM. The use of silica fume fillers in concrete produces increased physical strength. In a SFRM silica fume fillers also increase physical strength. But, they also significantly reduce set time (resulting in problems with pumpability and spray-ability), reduce adhesion (to the point of delamination) and increase shrinkage (which can lead to cracking). Finally, the use of Class C fly ash in concrete reduces shrinkage and increases physical strength. In a SFRM, however, Class C fly ash increases shrinkage and reduces adhesion (to the point of delamination).

The present disclosure is directed to a spray applied fire resistant material having water repellent agents, latex, and combinations thereof to reduce or eliminate water damage of the SFRM and the SFRM coated substrate.

SUMMARY

The present disclosure relates to water repellent coating compositions, kits and methods of applying the same, for use as fireproofing materials. For example, the water repellent coating composition can contain latex polymer(s), water repellent agent(s) such as silicone-based products, e.g., silanes, siloxanes, or combinations thereof. These compositions surprisingly exhibit reduced water permeability, increased physical strength, or both.

In one embodiment, the present disclosure relates to a fireproofing composition including a binder and a latex polymer. The composition can further include a silicone. The fireproofing composition can be applied to an article, such as a metal substrate. The use of one or more latex polymer and/or silicone in the fireproofing composition can increase the water repellency and the physical strength of the composition and underlying article or both, such as fireproofing materials like Fendolite® M-II and M-II/P. For example, the fireproofing composition can exhibit an improved or increased water repellency by at least about 10% as compared to similar compositions not containing a latex polymer and/or a silicone. The fireproofing composition can also exhibit an improved or increased strength by at least about 5% as compared to a similar compositions not containing a latex polymer and/or a silicone.

In another embodiment, the present disclosure relates to a method of producing a fireproofing composition, the method including forming a slurry comprising a binder, a latex polymer, optionally a silicone, and water; conveying the slurry to a length of hose; and introducing an amount of gas into the slurry in the length of hose at a flow rate and pressure sufficient to cause the slurry to foam and to convey the foam through the length of hose.

In another embodiment, the present disclosure relates to a method of increasing water repellency of a fireproofing composition, the metal substrate coated with a fireproofing composition, or both, the method including providing a metal containing substrate; and coating the substrate with a fireproofing composition comprising a binder, a latex polymer and optionally a silicone to form a fireproofing coated metal containing substrate.

BRIEF DESCRIPTION OF THE FIGURES

The foregoing and other features and advantages provided by the present disclosure will be more fully understood from the following description of exemplary embodiments when read together with the accompanying drawings, in which:

FIG. 1 shows an exemplary water immersion test wherein coated blocks are placed in water, as described in Example 3.

FIG. 2 shows exemplary blocks which have been cut to measure the water penetration into the coated blocks, as described in Example 3.

FIG. 3 shows exemplary, cut blocks that are uncoated, as described in Example 3.

FIG. 4 shows exemplary, cut blocks coated with various amounts of a silicone additive, e.g., SILRES® Powder D (Wacker Chemie AG) referred to herein as "SD" as described in Example 3.

FIG. 5 shows exemplary, cut blocks coated with a latex polymer, e.g., VINNAPAS® 5518 H (Wacker Chemie AG) referred to as "WAK", or both a latex polymer and a silicone additive e.g., SILRES® Powder D, referred to as "WAK-SD", as described in Example 3.

FIG. 6 shows exemplary, cut blocks coated with a latex polymer (e.g., DLP or WAK) both a latex polymer and a silicone additive (e.g., WAK-SD), as described in Example 3. "DLP" refers to DOW™ Latex Powder 500.

DETAILED DESCRIPTION

The present disclosure relates to water repellent coating compositions, kits and methods of applying the same, for use as fireproofing materials.

In one embodiment, the present disclosure relates to a fireproofing composition comprising a binder and at least one latex polymer.

The choice of binder can be any known binder for use in a fireproofing material or a SFRM. In particular, the binder can be selected from Portland cement, which is a mixture of various calcium-aluminum silicates, Pozzolanas which can be a natural or artificial material containing silica in a reactive from, such as volcanic ash, calcined clay, fly ash, silica fume, rice ash etc., Pozzolanic cement, which a mixture of Portland cement and pozzolanic materials, quicklime or hydrated lime, Gypsum plaster and calcium aluminate cement.

The amount of binder in the fireproofing composition can vary depending on the substrate, the level of protection needed and other similar factors. The amount of binder in the fireproofing composition can be greater than about 20%, 25%, 30%, 35%, 40%, 45%, 50%, 55%, 60%, 65%, 70%, 75% or about 80% by weight. These values can also define a range of binder in the composition, such as from about 40% to about 70%.

Water repellency in the SFRM can be provided, in part, by the addition of a latex polymer or polymers in the fireproofing composition. The latex polymer can be a hydrophobic polymer or a polymer having hydrophobic properties. As used herein, the term "hydrophobic polymer" refers to a polymer that repels, tends not to combine with, or is incapable of dissolving in water. Characteristics of hydrophobic polymer surfaces are high contact angle with a water droplet, poor adhesiveness to wet surfaces, poor wettability and low solid surface free energy. The latex polymer can fill and seal voids, can form an impermeable latex film, can coat particles to provide hydrophobicity, can retain a sufficient amount of water for cement hydration, or combinations thereof. In one embodiment, the inclusion of a latex polymer can provide an environment where curing of the binder occurs as well as provide on-going water repellency.

In one embodiment, a variety of dried latex materials are available from, for example Wacker and Dow. In another embodiment, the latex polymer can be selected from the group consisting of polyvinyl acetate or a vinyl acetate copolymer, a polyacrylate or a polyacrylate copolymer, a polyvinyl acrylate or a vinyl acrylate copolymer, a polyethylene or a polyethylene copolymer, a polystyrene or a polystyrene copolymer, a polyvinyl chloride or a polyvinyl chloride copolymer, a polyvinyl ester or a polyvinyl ester copolymer, a poly(ethylene-vinyl acetate) (PEVA) or a PEVA copolymer, a styrene butadiene rubbers (SBR), a styrene/acrylate copolymer, and combinations thereof. In particular, the latex polymer can be VINNAPAS® 5518 H supplied by Wacker ("WAK"), which is a vinyl acetate/ethylene copolymer, or DOW™ Latex Powder 500 (DLP-500) supplied by DOW Construction Chemicals, which is a 100% acrylic copolymer.

The pH of the fireproofing composition can vary. In some embodiments, the pH of the fireproofing composition can be basic, for example, when Portland cement is used as a binder. The latex polymer, or hydrophobic polymer, can be a polymer that is stable in a fireproofing composition at a high pH. The pH of the fireproofing composition can be greater than about 6, 6.5, 7, 7.5, 8, 8.5, 9, 9.5, 10, 10.5, 11, 11.5, 12, 12.5 or about 13. These values can also define a range, such as about 10 to about 13.

The latex polymer can be added to the SFRM in a liquid latex form or as dried polymeric latex solids. If a liquid polymeric latex is used, it will generally be combined with a desired amount of water and combined with the dry ingredients of the composition to form the mixed composition before its application to a substrate. Examples of latex polymer, e.g., liquid latex polymer, include the Elvax® series of ethylene vinyl acetate copolymer dispersions from Dupont and the Avicor® series of acrylic resins from Celanese. If a dried latex polymer is used, it will generally be combined and blended with the dry ingredients. The average particle size of the dried latex polymer can be about 0.01, 0.05, 0.08, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 2, 3, 4, 5, 6, 7, 8, 9 or about 10 microns. These values can also be used to define a range, such as about 0.1 to about 1 micron. Examples of commercially available dried latex polymers include sprayed dried VINNAPAS® 5518 H and DOW™ Latex Powder 500.

The dispersible polymer powder can have a strong hydrophobic effect. In one embodiment, the polymer(s) and silicone(s) are uniformly distributed throughout the composition.

The amount of latex polymer(s) in the fireproofing composition can vary depending on the substrate, the level of water repellency needed and other similar factors. The amount of latex polymer(s) in the fireproofing composition can be greater than about 0.1%, 0.2%, 0.3%, 0.4%, 0.5%, 0.6%, 0.7%, 0.8%, 0.9%, 1.0%, 2%, 3%, 4%, 5%, 6%, 7%, 8%, 9%, 10%, 11%, 12%, 13%, 14%, 15%, 16%, 17%, 18%, 19%, or about 20% by weight. These values can also define a range of latex polymer(s) in the composition, such as from about 0.1% to about 20%, or about 0.5% to about 5%.

The composition can also contain another water repellent agent including at least one silicone, such as silanes and siloxanes, in particular ones that are polymeric in nature (e.g., "resins"). The water repellent agent can be an agent containing reactive silicones. The silicones can be in solid form such that they can be incorporated into dry products. The agent can provide protection against moisture, anions (e.g., chlorides), other hydrophilic moieties, etc. and increase the service life for the coating composition, underlying substrate or both.

The silicone can be a hydrocarbon-substituted silanes selected from the group consisting of methyltrimethoxysilane, propyltrimethoxysilane, phenyltrimethoxysilane, dodecyltrimethoxysilane, octadecyltrimethoxysilane, amyltrimethoxysilane, ethyltrimethoxysilane, vinyltrimethoxysilane, methyltriisopropoxysilane, gamma-mercaptopropyltrimethoxysilane, omega-hydroxyhexytriisopropoxysilane, delta-cyanobutyltriethoxysilane and combinations thereof.

The silicone can also be an alkyltrialkoxy compound selected from the group consisting of propyl trimethoxy silane, propyl triethoxy silane, isopropyl trimethoxy silane, isopropyl triethoxy silane, butyl trimethoxy silane, butyl triethoxy silane, iso butyl trimethoxy silane, iso butyl triethoxy silane, sec butyl trimethoxy silane, sec butyl triethoxy silane, tert butyl trimethoxy silane, tert butyl triethoxy silane, hydrogen polysilicone and combinations thereof.

The silicone can be an organic silicon compound having the general formula: $R^2$—$Si(OR^1)_3$, where $R^1$ is an alkyl or oxalkyl residue with 1-4 carbon atoms and $R^2$ is any saturated or unsaturated alkyl, aryl, cycloalkyl or aralkyl residue, as well as siloxanes having the general formula $R^3$—$[Si(R)_2(O)]_n$—$R^3$ wherein $R^3$ indicates any similar or different, saturated or unsaturated alkyl, aryl, cycloalkyl or aralkyl residues and n can be greater than 2. Examples of these silanes include ethyl, butyl and hexyl trimethoxy silanes, methyl, ethyl, propyl or butyl-tri(2-methoxyethoxy)-silanes, tri-(ethoxy-ethoxy)-silane, phenyl triethoxysilane and cresyl triethoxysilanes. Examples of these siloxanes include hexamethyl disiloxane, hexaphenyl-disiloxane, dimethyltetraphenyl-disiloxane, tetramethyl diphenyl disiloxane or a corresponding methyl-ethyl, methyl-butyl and ethyl-phenyl-siloxanes. The preparation of the silicones in the present disclosure can be performed using generally known methods.

In particular, the silicone can be the hydrophobic silicone resins SILRES® BS 1321, SILRES® H44, SILRES® BS 94, SILRES® Powder D ("SD") or combinations thereof, available from Wacker Chemie AG, Munich Germany. SILRES® BS 1321 is a solvent-free, methyl silicone resin with high reactivity and improved resistance to heat. SILRES® BS 1321 is soluble in aromatics, esters, ketones and selected paraffins and chlorinated hydrocarbons. When measured by differential scanning calorimetry (DSC), SILRES® BS 1321 has a glass transition temperature range of 35 to 55 degrees Celsius. SILRES® BS 1321 remains solid at ambient temperature. SILRES® H44 is a powdered phenylmethyl polysiloxane resin with good heat stability and often used as a binder for the socket cement of high-temperature incandescent lamps. SILRES® H44 is readily soluble in industrial ethyl alcohol, butyl alcohol, acetone, halogenated hydrocarbons, aromatic hydrocarbons, ketones, ethers, and esters. SILRES® H44 has a glass transition temperature of no less than 30 degrees Celsius.

The silicone can be silicone resins that are solid, highly branched, crosslinked polymers substantially insoluble in water but generally soluble in solvents. In one embodiment, the silicone is a solid hydrophobic silicone resin in a particulate form. In another embodiment, the silicone is a dispersion in water. In a particulate form, the average particle size of the silicone can be about 0.01, 0.05, 0.08, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 2, 3, 4, 5, 6, 7, 8, 9 or about 10 microns. These values can also be used to define a range, such as about 0.2 to about 0.5 micron.

The amount of silicone(s) in the fireproofing composition can vary depending on the substrate, the level of water repellency needed and other similar factors. The amount of silicone(s) in the fireproofing composition can be greater than about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 11%, 12%, 13%, 14%, 15%, 16%, 17%, 18%, 19%, or about 20% by weight. These values can also define a range of silicone(s) in the composition, such as from about 0.1% to about 15%, or about 0.5% to about 5%.

In some embodiments, the composition can contain both a latex polymer(s) and a silicone(s). The total amount of both latex polymer(s) and silicone(s) in the fireproofing composition can vary depending on the substrate, the level of water repellency needed and other similar factors. The amount of latex polymer(s) and silicone(s) in the fireproofing composition can be greater than about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29% or about 30% by weight. These values can also define a range of latex polymer(s) and silicone(s) in the composition, such as from about 0.1% to about 25%, or about 0.5% to about 10%.

In some embodiments, the metal substrate coated with the fireproofing composition can further be coated with a water repellent layer (e.g., a latex layer). For example, a latex, epoxy or other polymeric layer can be applied over the SFRM coated metal substrate. In other embodiments, the metal substrate coated with the fireproofing composition does not require and does not have an additional water repellent layer (e.g., a latex, epoxy or other polymeric layer) coating onto or over the fireproofing composition.

In another embodiment, the SFRM composition may contain a dispersing aid, such as fine mineral fillers, for example, clay.

The SFRM composition can also contain a filler. The choice of filler can be any known filler for use in a fireproofing material or a SFRM. In particular, the filler can be selected from silica, diatomaceous earth, alumina, zinc oxide, titanium oxide, calcium oxide, magnesium oxide, iron oxide, tin oxide, antimony oxide, ferrites, calcium hydroxide, magnesium hydroxide, aluminum hydroxide, basic magnesium carbonate, calcium carbonate, magnesium carbonate, zinc carbonate, barium carbonate, dawsonite, hydrotalcite, calcium sulfate, barium sulfate, gypsum fiber, a potassium salt such as calcium silicate, etc., vermiculite, kaolin, mica, talc, clay, mica, montmorillonite, bentonite, activated clay, sepiolite, imogolite, sericite, glass fiber, glass beads, ceramic beads, silica series balloon, aluminum nitride, boron nitride, silicon nitride, carbon black, graphite, carbon fiber, carbon balloon, charcoal powder, various kinds of metal powder, potassium titanate, magnesium sulfate, lead zirconate titanate, aluminum borate, molybdenum sulfide, silicon carbide, stainless fiber, zinc borate, various kinds of magnetic powder, slug fiber, fly ash, inorganic series phosphorus compound, silica-alumina fiber, alumina fiber, silica fiber, and zirconia fiber.

The amount of filler in the fireproofing composition can vary depending on the substrate, the level of protection needed and other similar factors. The amount of filler in the fireproofing composition can be greater than about 10%, 20%, 25%, 30%, 35%, 40%, 45%, 50%, 55%, 60%, 65%, 70%, 75%, 80%, 85%, 90% or about 95% by weight. These values can also define a range of filler in the composition, such as from about 35% to about 70%, or about 20% to about 90%, or about 20% to about 80%.

The fireproofing composition can have a low density, such as a density lower than concrete. The fireproofing composition can have a density of less than about 90, 85, 80, 75, 70, 65, 60, 55, 50, 45, 40, 35, 30, 25 or about 20 pcf as determined by ASTM E605. These values can also define a range, such as between about 40 and about 80 pcf.

The use of a water repellent additive (e.g., a latex polymer(s), a silicone(s) or both) of the present disclosure has been found to substantially improve the water repellency of the fireproofing composition, the underlying substrate, or both. The water repellency of a fireproofing composition can be measured by the water permeability test as described in Example 3, or similar. The water repellency of the fireproofing composition can provide water protection, as measured by the water permeability test, for greater than about 12, 24, 36, 48 or 72 hours, or 4, 5, 6, 7, 8, 9, 10, 11, 12, 13 or 14 days, or 2, 3, 4, 5, 6, 7 or 8 weeks. These values can also be used to define a range, such as about 24 to about 72 hours. In some embodiments, the water repellency of the fireproofing composition is about 2% greater than the water repellency of a similar composition not containing the water repellent additive(s) of the present disclosure. In other embodiments, the water repellency of the fireproofing composition is about 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45% or about 50% greater than the water repellency of a similar composition not containing the water repellent additive(s) of the present disclosure. These values can also define a range, such as an increase in water repellency from about 5% to about 15%.

The use of a water repellent additive (e.g., a latex polymer(s), a silicone(s) or both) of the present disclosure has been found to substantially improve the strength (e.g., compression strength, flexural strength, bond strength, etc.) of the fireproofing composition, the underlying substrate or both. The compression strength of a fireproofing composition is a measure of physical performance. The compression strength of the fireproofing composition can be greater than about 40,000 or 45,000 or 50,000, or 55,000 or 60,000, or 65,000 or 70,000 or 75,000 or about 80,000 psf when tested in accordance with ASTM E761. The flexural strength of a fireproofing composition is one measure of tensile strength of concrete. The flexural strength of the fireproofing composition can be greater than about 1, 2, 3, 4, 5, 6, 7, 8, 9 or about 10 MPa when tested in accordance with the plank flexural strength test ASTM C78. The bond strength of a fireproofing composition is a measure of the SFRM to substrate bond strength. The bond strength of the fireproofing composition can be greater than about 0.2, 0.4, 0.6, 0.8, 1, 2, 3, 4, 5, 6, 7, 8, 9 or about 10 MPa when tested in accordance with ASTM C78.

In some embodiments, the compressive strength, flexural strength, bond strength, or combinations thereof of the fireproofing composition is about 2% greater than the strength of a similar composition not containing the water repellent additives(s) of the present disclosure. In other embodiments, the compressive strength, flexural strength, bond strength, or combinations thereof of the fireproofing composition is about 3%, 4%, 5%, 6%, 7%, 8%, 9%, 10%, 11%, 12%, 13%, 14%, 15%, 16%, 17%, 18%, 19% 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or about 50% greater than the strength of a similar composition not containing the water repellent additive(s) of the present disclosure. These values can also define a range, such as an increase in the compressive strength, flexural strength, bond strength, or combinations thereof from about 10% to about 30%.

Fireproofing compositions are typically supplied as dry mixture. They are formed into slurries upon the addition of an appropriate amount of water prior to application. The time between preparation and application may span many hours. Thus, the setting time or set time of the mixture is important. In most embodiments, it is desired to achieve a quick setting time of the composition upon spray application to provide body to the fireproofing. If the mixture were to stiffen substantially in the mixer, it would be rendered non-pumpable and therefore would be useless for the intended application. If the mixture were to not stiffen substantially upon application, it would also be rendered useless for the intended application.

The use of the water repellent additive(s) of the present disclosure does not substantially or negatively affect the set time of the fireproofing composition. The set time of the fireproofing composition can be greater than about 10, 15, 20, 25, 30, 35 or 40 minutes as measured by using a 200 g cylindrical steel plug with a 1 inch diameter×½ inch thick foot. The set time can also be less than about 180, 170, 160, 140, 150, 130, 120, 110, 100, 90, 80, 70, 60 or about 50 minutes. This values can also be used to define a range, such as between about 30 and about 60 minutes. The set time of the fireproofing composition is less than about 50% different (i.e., either lesser or greater) than the set time of a similar composition not containing a water repellent additive of the present disclosure. In other embodiments, the set time of the fireproofing composition is less than about 40%, 35%, 30%, 25%, 20%, 15%, 10%, 5%, 2% or 1% different than the set time of a similar composition not containing the water repellent additive(s) of the present disclosure. These values can also define a range, such as a set time from less than about 10% greater to less than about 15% less than compared to a composition without the water repellent additive(s) of the present disclosure.

Similarly, the pot time of the fireproofing composition is less than about 50% different (i.e., either lesser or greater) than the pot time of a similar composition not containing the water repellent additive of the present disclosure. In other embodiments, the pot time of the fireproofing composition is less than about 40%, 35%, 30%, 25%, 20%, 15%, 10%, 5%, 2% or 1% different than the pot time of a similar composition not containing the water repellent additive(s) of the present disclosure. These values can also define a range, such as a pot time from less than about 15% greater to less than about 20% less than compared to a composition without the water repellent additive(s) of the present disclosure.

In another embodiment, the present disclosure relates to an article comprising a metal substrate, and a fireproofing composition as provided herein on the metal substrate. The metal substrate can include beams, columns, roofs, decks, floors and plates and the like.

In another embodiment, the present disclosure relates to a method of producing a fireproofing composition, the method including forming a slurry comprising a binder, a latex polymer and water; conveying the slurry to a length of hose which is typically less than about 500 feet; introducing an amount of gas (e.g., air) into said slurry in said length of hose at a flow rate and pressure sufficient to cause said slurry to foam and to convey said foam through said length of hose. The method can also include spray applying the foam to a substrate and allowing it to harden on the substrate. The slurry can further include a silicone, as provided herein.

In another embodiment, the present disclosure relates to a method of increasing water repellency of a fireproofing composition, a metal containing substrate or both, the method including providing a metal containing substrate, and coating the substrate with a fireproofing composition comprising a binder, a latex polymer to form a fireproofing coated metal containing substrate. The water repellency of the fireproofing coated metal containing substrate can be increased by at least about 10% as compared to a similar composition not containing a latex polymer(s). The strength of the fireproofing coated metal containing substrate can also be increased by at least about 10% as compared to a similar fireproofing not containing a latex polymer(s). The composition can further include a silicone, as provided herein.

The disclosures of all cited references including ASTM methods, publications, patents, and patent applications are expressly incorporated herein by reference in their entirety.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The present invention is further defined in the following Examples. It should be understood that these Examples, while indicating preferred embodiments of the invention, are given by way of illustration only.

EXAMPLES

Example 1

The effect of a latex additive on the physical strength of Fendolite® MII, Fendolite® MII/P was measured. A 113.4 gram amount of the latex additive VINNAPAS® 5518H supplied by Wacker Cortec was mixed with 50 lbs of Fendolite® MII, MII/P (MII-Latex, MII/P-Latex). A 113.4 gram amount of the latex additive VINNAPAS® 5518H was also mixed with 50 lbs of Fendolite® MII, MII/P containing 45.4 g MCI® 2006 NS supplied by Cortec (MII-Latex-MCI, MII/P-Latex-MCI). Fendolite® MII, MII/P was used as a control (MII, MII/P). MCI® 2006 NS is a representative concrete admixture in powder form. It is an organic-inorganic formulation which contains migrating corrosion inhibitors. MCI® 2006 NS can provide protection to reinforcing steel and other metals embedded in concrete from corrosion induced by carbonation, chlorides and other destructive elements of the environment.

The components were initially mixed until uniformly distributed using a drum mixer. 4.75 gallons of water was added into each mixture and each mixture was mixed for an additional 3 minutes at a speed of 40 rpm using a stone mixer. The slurry was sprayed onto a 12"×12"×1" wooden frame following the Fendolite® MII and MII/P application instructions. Application instructions included mixing the dry material with its appropriate water amounts, e.g., 4.75 gallons and 3.75 gallons for Mil and MII/P, respectively. The slurries were mixed for 3 minutes. Using a rotor stator pump, the slurry was pumped through a hose using different nozzle pressures, 50 psi and 80 psi for Mil and MII/P, respectively. The nozzle was held 6 inches from the wooden frame and sprayed using a uniform pattern to completely cover the entire surface and perimeter of the casing.

The sprayed samples were dried at ambient condition for 28 days, then the compressive strength, flexural strength, bond strength were measured using Com-Ten Compression Machine and custom-made bond strength machine. The Com-Ten Compression Machine required cured samples of Mil and MII/P to be cut to 2"×2"×1" in dimension. The samples were placed between two metal plates that compressed at a rate of 1114 in/min. Samples were compressed to 0.10 inches of deflection and computer software connected to the compression machine displayed a corresponding compression force. Formulation for compressive strength was calculated in pcf.

The custom-made bond strength machine uses a hook mechanism connected to a pull tester that is hung vertically downwards. Epoxy was used to place a hook cap on top of the Mil and MILT material which had been sprayed on 12"×12" steel plates, then cured and dried. The steel plates are placed under the pull tester and then pulled by the connection of the hooks. The peak force was that displayed when the pull tester pulls oft the epoxy cap. This peak force was used to calculate the bond strength in psf.

Three data points were collected from each sample to obtain an average value. Table 1 lists the compressive strength, flexural strength and bond strength of Fendolite® MII and MII/P with and without a latex polymer. It is clear that the addition of a latex polymer, e.g., VINNAPAS® 5518H, increases the physical strength of MII and MII/P, irrespective of addition of MCI 2006NS.

TABLE 1

Physical strength of Fendolite ® MII and MII/P with and without a latex polymer.

| | Additives to Composition | Increased % | | |
| --- | --- | --- | --- | --- |
| | | Compressive strength | Flexural strength | Bond strength |
| MII | — | — | — | — |
| MII-Latex | 1.0 wt % Latex | 34.9 | 28.1 | 30.1 |
| MII-Latex-MCI | 1.0 wt % Latex 0.2 wt % MCI | 34.6 | 30.2 | 40.0 |
| MII/P | — | — | — | — |
| MII/P-Latex | 1.0 wt % Latex | 18.3 | 22.5 | 35.2 |
| MII/P-Latex-MCI | 1.0 wt % Latex 0.2 wt % MCI | 19.6 | 23.7 | 34.9 |

Example 2

The effect of a water repellent agent on the physical strength of Fendolite MII, Fendolite MII/P was measured. A 45.4 gram or 113.4 gram amount of SILRES® Powder D supplied by Wacker was mixed with 50 lbs of Fendolite® MII. These amounts represent a 0.2 wt % (SDA) and a 0.5 wt % (SDB) additive amount. The compositions were prepared using the same procedure in Example 1.

The sprayed samples were dried at ambient condition for 28 days, then the compressive strength and bond strength were measured by using Com-Ten Compression Machine and custom-made bond strength machine. Three data points were collected from each sample to obtain an average value. Table 2 lists the compressive strength and bond strength of Fendolite® MII with and without SILRES® Powder D. It is clear that the addition of a silicone, e.g., SILRES® Powder D, improves the physical strength of Fendolite® MII.

TABLE 2

Physical strength of Fendolite ® MII with and without a silicone.

| | | Increased % | |
|---|---|---|---|
| | Additives to Composition | Compressive strength | Bond strength |
| MII | — | — | — |
| MII-Powder D1 | 0.2 wt % Powder D | 3.5 | 25.4 |
| MII-Powder D2 | 0.5 wt % Powder D | 4.6 | 26.6 |

Example 3

The water permeability of various SFRM compositions of the present disclosure were tested. Samples were prepared similar to Examples 1 and 2 as having variable amounts of additive(s), such as VINNAPAS® 5518H, SILRES® Powder D, DLP-500 from DOW Construction Chemicals (a 100% acrylic redispersible powder "DLP"), or combinations thereof. Table 3 lists the additive and relative amount of additives added to the Fendolite® MII and MII/P compositions. The compositions of Table 3 were sprayed onto a 12"×12"×1" frame similar to Example 1.

The sprayed samples were dried at ambient condition for 28 days, then the samples were cut into 2"×2"×1" blocks and caulked on five surfaces using weatherproof Silicone manufactured by GE (Clear Silicone II). The unsealed surface of each test specimen was immerged into about 2-4 mm of water. FIG. 1 shows exemplary samples immersed in water. The test specimens were taken out of the water at different times and cut into two pieces. FIG. 2 shows various cut sample blocks. The cross section of the cut blocks was dipped in phenolphthalein dry powder. The phenolphthalein turns the wetted sections of the specimen pink. FIGS. 3-6 show the cross section of the cut blocks with various levels of pink coloring. Table 3 shows the estimated time for complete penetration of the tested specimen blocks. These figures and Table 3 show that the addition of a latex polymer, a silicone and the combination thereof significantly reduces the water penetration.

TABLE 3

Test specimens composition and penetration time.

| Samples | Additives to Composition | Penetration time |
|---|---|---|
| MII | — | 6-8 hrs |
| MII-SDA | 0.2 wt % SILRES ® Powder D | 32-48 hrs |
| MII-SDB | 0.5 wt % SILRES ® Powder D | >78 hrs |
| MII-WAK | 1.0 wt % VINNAPAS ® 5518H | >144 hrs |
| MII-WAK-SD | 1.0 wt % VINNAPAS ® 5518H 0.2 wt % SILRES ® Powder D | >144 hrs |
| MII/P | — | 16-22 hrs |
| MII/P-DLP | 1.0 wt % DLP-500 | >240 hrs |
| MII/P-WAK | 1.0 wt % VINNAPAS ® 5518H | >384 hrs |
| MII/P-WAK-SD | 1.0 wt % VINNAPAS ® 5518H 0.2 wt % SILRES ® Powder D | >384 hrs |

While this disclosure has been particularly shown and described with reference to example embodiments thereof, it will be understood by those skilled in the art that various changes in form and details may be made therein without departing from the scope of the invention encompassed by the appended claims.

I claim:

1. A method of producing a fireproofing composition, the method comprising:
   (i) forming a slurry comprising a binder, at least one latex polymer, at least one silicone, and water;
   (ii) conveying the slurry to a length of hose; and
   (iii) introducing an amount of gas into the slurry in the length of hose at a flow rate and pressure sufficient to cause the slurry to foam and to convey the foam through the length of hose.

2. The method of claim 1, wherein the binder is selected from the group consisting of portland cement, pozzolanas, pozzolanic cement, quicklime, plaster and calcium aluminate cement.

3. The method of claim 1, wherein the latex polymer is selected from the group consisting of a polyvinyl acetate, a vinyl acetate copolymer, a polyacrylate, a polyacrylate copolymer, a polyvinyl acrylate, a vinyl acrylate copolymer, a polyethylene, a polyethylene copolymer, a polystyrene, a polystyrene copolymer, a polyvinyl chloride, a polyvinyl chloride copolymer, a polyvinyl ester, a polyvinyl ester copolymer, a poly(ethylene-vinyl acetate) (PEVA), a PEVA copolymer, a styrene butadiene rubber (SBR), a styrene/acrylate copolymer, and combinations thereof.

4. The method of claim 1, comprising about 0.1 wt % and about 20 wt % of a latex polymer in the composition.

5. The method of claim 1, wherein the composition has a density of less than about 90 pounds per cubic foot.

6. The method of claim 1, wherein the silicone is selected from the group consisting of silicone resins, siloxanes and silanes.

7. The method of claim 1, comprising about 0.1 wt % and about 15 wt % of silicone in the composition.

8. The method of claim 1, comprising about 0.1 wt % and about 30 wt % of both latex polymer and silicone in the composition.

9. The method of claim 1, further comprising spray applying the foam to a substrate and allowing it to harden on the substrate.

10. The method of claim 1, wherein water repellency of a metal containing substrate coated with the foam is increased by at least about 10% as compared to a similar coating composition not containing the at least one latex polymer and the at least one silicone.

11. The method of claim 1, wherein strength of a metal containing substrate coated with the foam is increased by at least about 5% as compared to a similar coating composition not containing the at least one latex polymer and the at least one silicone.

* * * * *